United States Patent [19]

Moore et al.

[11] 3,893,965

[45] July 8, 1975

[54] COPOLYMERS OF SULFUR DIOXIDE WITH ALLYL GLYCEROL ETHERS

[75] Inventors: William Ross Moore, Lake Jackson, Tex.; Ralph Rolland Langner, Midland, Mich.

[73] Assignee: The Dow Chemical Company, Midland, Mich.

[22] Filed: Feb. 4, 1974

[21] Appl. No.: 438,957

Related U.S. Application Data

[60] Division of Ser. No. 274,583, July 24, 1972, abandoned, which is a continuation-in-part of Ser. No. 86,948, Nov. 4, 1970, abandoned.

[52] U.S. Cl. .......... 260/29.6 H; 204/159.22; 260/8; 260/17 R; 260/17.4 ST; 260/67 S; 260/73 R; 260/73 L; 260/79.3 A
[51] Int. Cl. .............................................. C08f 45/34
[58] Field of Search ........ 260/29.6 R, 29.6 H, 73 R, 260/73 L, 67 S, 79.3 A

[56] References Cited

UNITED STATES PATENTS

| | | | |
|---|---|---|---|
| 2,098,108 | 11/1937 | Reppe et al. | 260/67 S |
| 2,937,163 | 5/1960 | Lang | 260/79.3 A |
| 3,308,102 | 3/1967 | Wilson | 260/79.3 A |
| 3,792,027 | 2/1974 | Panzer et al. | 260/73 R |

FOREIGN PATENTS OR APPLICATIONS 14,587    4/1966    Japan

*Primary Examiner*—Lucille M. Phynes
*Attorney, Agent, or Firm*—Benjamin G. Colley

[57] ABSTRACT

Copolymers of sulfur dioxide with allyl glycerol ethers. These copolymers in a water solution can be reacted with paraformaldehyde or glyoxal and the resulting solution when dried produces a tough cross-linked film which is water resistant and useful to protect metal substrates from corrosion. These copolymers are also useful as surfactants.

6 Claims, No Drawings

COPOLYMERS OF SULFUR DIOXIDE WITH ALLYL GLYCEROL ETHERS

CROSS REFERENCE TO RELATED APPLICATIONS

This application is a division of Ser. No. 274,583, filed July 24, 1972, which is a continuation-in-part of Ser. No. 86,948, filed Nov. 4, 1970, both now abandoned.

BACKGROUND OF THE INVENTION

This invention relates to the reaction product of sulfur dioxide and an allyl glycerol ether and also to the composition of matter resulting from the reaction of glyoxal or paraformaldehyde with the above.

It is known from Ushakov et al. (Chem. Abstracts 44:1746 a) that allyl alcohol can be copolymerized with sulfur dioxide to produce a resin. However, these copolymers suffer from the disadvantage that they are not water soluble and are soluble only in pyridine and strong mineral acids.

It is also known from Japanese Pat. No. 14,587/66 that allyl hydroxyethyl ether can be copolymerized with $SO_2$ to produce a water insoluble copolymer.

SUMMARY OF THE INVENTION

It has been found that a solid copolymer can be produced from the reaction of sulfur dioxide and allyl glycerol ether and that this copolymer dissolved in water can be reacted with paraformaldehyde or glyoxal at a pH less than 4 to produce a reaction product which remains in solution but when the water evaporates produces a tough transparent film which is water insoluble. This film is useful to coat metals to give them a protective coating as, for example, the mothballing of steel machinery and steel parts for outdoor storage and shipment. The uncrosslinked copolymers are also useful per se as surfactants.

DETAILED DESCRIPTION

The sulfur dioxide copolymers of this invention are formed from $SO_2$ and allyl glycerol ether.

Representative examples of the monomers which are copolymerized with sulfur dioxide to produce the above copolymers are:

alpha-monoallyl glycerol ether,
beta-monoallyl glycerol ether

If desired, mixtures of the foregoing ethers may be used with equally good results.

As is well known from the prior art, the sulfur dioxide and the unsaturated ethers copolymerize in equimolar proportions.

The copolymers are made by reacting the above monomers with sulfur dioxide in an inert organic solvent such as a chlorinated hydrocarbon or a lower hydrocarbon solvent. Examples of the former are 1,1,1-trichloroethane, chloroform, and perchloroethylene, etc. Examples of the latter are heptane, Stoddard solvent, petroleum ether, kerosene, etc.

In general, the process involves saturating the solvent with sulfur dioxide in a reaction flask and then adding the unsaturated monomer dropwise over a period of time ranging from one minute to 72 hours in the presence of a catalytic agent.

The polymerization must be effected with the aid of irradiation or a chemical catalyst. When irradiation is used, the amount can vary from about 0.02 to about 5.0 megarad. Gamma rays or high velocity electrons are satisfactory for use in this process. If desired, a chemical catalyst may be used to supplement the polymerization by irradiation. The chemical catalysts used herein comprise ionic type catalyst (such as silver nitrate, lithium nitrate and ammonium nitrate) and peroxide type free radical catalysts (such as methylethylketone peroxide and t-butylperoxy pivalate). When an ionic type catalyst is used, it is used in an amount from about 0.001 to 3 percent by weight based on the weight of the unsaturated monomer present. Similarly, when a free-radical catalyst is used the amount needed varies from about 0.05 to 5.0 percent based on the weight of the unsaturated monomer.

The temperature of the polymerization reaction can vary from −50°C. to 50°C. with the range from 0°C. to 30°C. being preferred. Normally, sufficient pressure is maintained on the reaction mixture to keep the contents in the liquid phase. However, the pressure can range from 1 to 100 pounds per square inch gauge (p.s.i.g.) with 1 to 20 p.s.i.g. being the preferred range. The molar ratio of the monomers can vary from 0.1 to 1 moles of sulfur dioxide to unsaturated monomer to 100:1 with a range from 1:1 to 10:1 being preferred.

The copolymer is insoluble in the inert solvents and is recovered as a fine powder by filtration followed by washing with the pure solvent.

Crosslinked films are prepared from these copolymers in the following manner.

The copolymers are dissolved by agitating them in water having a temperature of from about 50°C. to about 90°C. so as to prepare an aqueous solution of the copolymer having a concentration in the range of 10–50 percent by weight. The pH is then adjusted to 4 or less using mineral acids. A small amount (ranging from 1–10% by weight based on the weight of the copolymer) of glyoxal or paraformaldehyde is added to the above solution after it is cooled to room temperature. When the resulting solution is sprayed, painted or otherwise coated on metallic substrates and allowed to dry for 12–24 hours, the film that is obtained is very hard, clear, and non-hydroscopic. Surprisingly, these films could not be removed by immersion in water and showed no signs of attack by water after 2 days at room temperature.

It is also possible and desirable when coating vertical surfaces to thicken the aqueous copolymer solutions so that they will not flow or run to any appreciable extent. Examples of the thickening agents which have been found to thicken the solution without interfering with the copolymer crosslinking are Kelzan (a polysaccharide known as xanthan gum), Methocel HG (a hydroxypropyl methyl cellulose), gelatin, and starch. These are added in an amount varying from 1–10% by weight based on the copolymer weight.

The invention is further illustrated by the following examples which are not to be construed as a limitation on the scope of the claims.

EXAMPLE 1

A resin kettle was set up in a cold water bath in a vented hood. The kettle was charged with 11.5 moles (1000 mls) 1,1,1-trichloroethane and was then saturated with $SO_2$ gas at 23°C. The bath was then cooled to 20°C. and 12 mls Lupersol 11 initiator (a 75% by weight solution of t-butylperoxy pivalate in mineral spirits) was added directly to the stirred reactor contents. Alpha-mono-allyl ether of glycerine (1.9 moles or 250 mls) immediately was added dropwise over a 45-minute period. Polymer precipitation occurred during the addition and conversion was substantially complete within 4 hours of initiation. After a 20 hour digestion period, the finely divided white powder was filtered using a No. 54 Whatman filter paper. The polymer was washed twice with 1 liter of 1,1,1-trichloroethane and was then dried in a vacuum oven at 46°C. for an 8-hour period. The polymer weighed 372 grams, a 93 percent yield based on a 1:1 mole ratio copolymer. The polymer was soluble in dimethylformamide, dimethyl sulfoxide, ethylene glycol and hot water (i.e., having a temperature greater than 50°C.) but was insoluble in butyl acetate, acetone, tetrahydrofuran, methyl isobutyl ketone, chloroform, toluene, perchloroethylene, p-dioxane, methylene chloride, petroleum ether, methanol, isopropyl alcohol and propylene glycol methyl ether. The polymer softened at 95°–105°C. and decomposed upon melting at 215°C.–225°C. Infrared analysis of the polymer indicated a large amount of polyether groups, high $SO_2$ content, and 10–15% hydroxy groups.

EXAMPLE 2

In the manner of Example 1, a 3-liter Pyrex resin kettle was charged with 2,000 mls (23 moles) 1,1,1-trichloroethylene and saturated with $SO_2$ gas at 20°C. The reactor contents were stirred at 250 rpm and then 24 mls Lupersol 11 initiator was added directly to the reactor. Immediately thereafter, 500 mls (3.8 moles) α-mono-allyl ether of glycerine was added dropwise over a 45-minute period. The polymer precipitated and conversion was substantially complete after approximately 2 hours of reaction time. After a 20-hour period, the polymer was filtered through a coarse filter paper and washed with 1,1,1-trichloroethylene. The powder was then stripped free of residual 1,1,1-trichloroethylene and $SO_2$ under vacuum at 30 mm. Hg and 30°C. The product was a finely divided, white, hygroscopic powder; it was obtained in 100% yield (based on a 1:1 mole ratio copolymer). The solubility and melt data were identical to that of the polymer in Example 1.

Similar equimolar copolymers of sulfur dioxide are obtained by following Example 2 and substituting equivalent amounts of 2-allyloxy ethanol, allyl 4-hydroxy-butyl ether, or mixtures thereof, for the alpha mono-allyl glycerol ether.

EXAMPLE 3

Allyl glycerol ether polysulfone (from Example 1) was dissolved in 70°C. water in an amount to make a 20% weight solution. The solution was cooled to 20°C. It remained nonviscous and clear with no precipitate seen.

Films were cast on glass slides using the above solution; they were allowed to dry overnight at ambient conditions. The films were moderately hard although hydroscopic and exhibited exceptional optical clarity with good adhesion to the glass substrate. The film was easily removed with water.

EXAMPLE 4

The solution of allyl glycerol ether polysulfone prepared in Example 3 was used to prepare a crosslinked film.

A total of 49 grams of the 20% weight solution of the polysulfone was placed in a bottle and to this was added 1 gram of 40% weight commercial glyoxal in water. The pH of the resulting solution was 2. The homogeneous solution remained clear and non-viscous after standing for 30 minutes at 20°C.

Films were cast on thin cold rolled steel plates (Q-panels) using this solution. The films were allowed to air-dry overnight at ambient conditions. The films were very hard and non-hydroscopic and exhibited exceptional optical clarity. The films could not be removed with water and, in fact, showed no signs of attack by water after 24 hours.

Similar results are obtained when paraformaldehyde is substituted for the glyoxal in whole or in part.

We claim:

1. A film prepared from the reaction of the copolymers of sulfur dioxide with a glycerol allyl ether selected from the group consisting of alpha allyl glycerol ether, beta allyl glycerol ether, and mixtures thereof with a member of the group consisting of glyoxal, paraformaldehdye, and mixtures thereof.

2. A film prepared from the reaction of the copolymer of sulfur dioxide with alpha monoallyl glycerol ether with a member of the group consisting of glyoxal, paraformaldehyde, and mixtures thereof.

3. A film prepared from the reaction of the copolymers of sulfur dioxide with a glycerol allyl ether selected from the group consisting of alpha allyl glycerol ether, beta allyl glycerol ether, and mixtures thereof with 1–10% by weight based on said copolymers of a member of the group consisting of glyoxal, paraformaldehyde, and mixtures thereof.

4. The film of claim 3 prepared from an aqueous solution of said copolymers containing 10–50 percent by weight of said copolymers.

5. A film prepared from the reaction of the copolymer of sulfur dioxide with alpha monoallyl glycerol ether with 1–10% by weight based on said copolymer of a member of the group consisting of glyoxal, paraformaldehyde and mixtures thereof.

6. The film of claim 5 prepared from an aqueous solution of said copolymer containing 10–50 percent by weight of said copolymer.

* * * * *